United States Patent
Jung et al.

(10) Patent No.: US 12,342,343 B2
(45) Date of Patent: Jun. 24, 2025

(54) METHOD FOR TRANSMITTING AND RECEIVING UPLINK CONTROL SIGNAL AND DEVICE FOR IMPLEMENTING SAME

(71) Applicant: SAMSUNG ELECTRONICS CO., LTD., Suwon-si (KR)

(72) Inventors: Euichang Jung, Suwon-si (KR); Seho Myung, Suwon-si (KR); Suyoung Park, Suwon-si (KR); Suha Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/585,319

(22) Filed: Feb. 23, 2024

(65) Prior Publication Data
US 2024/0196406 A1    Jun. 13, 2024

Related U.S. Application Data

(63) Continuation of application No. 18/089,706, filed on Dec. 28, 2022, now Pat. No. 11,937,247, which is a
(Continued)

(30) Foreign Application Priority Data

May 24, 2018   (KR) .................. 10-2018-0059043

(51) Int. Cl.
*H04W 72/21*       (2023.01)
*H04B 7/0408*     (2017.01)
(Continued)

(52) U.S. Cl.
CPC .......... *H04W 72/21* (2023.01); *H04B 7/0408* (2013.01); *H04L 41/0803* (2013.01); *H04W 72/044* (2013.01)

(58) Field of Classification Search
None
See application file for complete search history.

(56) References Cited

U.S. PATENT DOCUMENTS

| 9,942,886 | B1 | 4/2018 | John Wilson et al. |
| 10,952,231 | B2 | 3/2021 | Liou |

(Continued)

FOREIGN PATENT DOCUMENTS

| CA | 3042828 | 5/2018 |
| CN | 107750439 | 3/2018 |

(Continued)

OTHER PUBLICATIONS

Office Action for CN Application No. 201980032536.2 issued Mar. 27, 2024 and English translation, 20 pages.
(Continued)

Primary Examiner — Phirin Sam
(74) Attorney, Agent, or Firm — NIXON & VANDERHYE P.C.

(57) ABSTRACT

Disclosed are a communication technique for merging, with IoT technology, a 5G communication system for supporting a data transmission rate higher than that of a 4G system; and a system therefor. The present disclosure can be applied to intelligent services (for example, smart home, smart building, smart city, smart car or connected car, health care, digital education, retail, security, and safety-related services, and the like) on the basis of 5G communication technology and IoT-related technology. The present invention relates to a method and device for managing transmission beams of a terminal in a 5G system.

20 Claims, 8 Drawing Sheets

Related U.S. Application Data continuation of application No. 17/057,237, filed as application No. PCT/KR2019/006262 on May 24, 2019, now Pat. No. 11,553,466.

(51) Int. Cl.
*H04L 41/0803* (2022.01)
*H04W 72/044* (2023.01)

(56) References Cited

U.S. PATENT DOCUMENTS

| | | | |
|---|---|---|---|
| 11,115,242 B2* | 9/2021 | Akkarakaran | H04L 5/0023 |
| 11,140,562 B2 | 10/2021 | Lin | |
| 11,553,466 B2* | 1/2023 | Jung | H04L 5/0048 |
| 11,937,247 B2* | 3/2024 | Jung | H04L 5/0023 |
| 2017/0170942 A1 | 6/2017 | Qiu et al. | |
| 2018/0083680 A1 | 3/2018 | Guo et al. | |
| 2018/0103464 A1 | 4/2018 | John Wilson et al. | |
| 2018/0176788 A1 | 6/2018 | Yeo et al. | |
| 2018/0242231 A1 | 8/2018 | Reial | |
| 2018/0288753 A1 | 10/2018 | Kishiyama | |
| 2018/0335295 A1 | 11/2018 | Walecki | |
| 2019/0174466 A1 | 6/2019 | Zhang | |
| 2019/0190582 A1* | 6/2019 | Guo | H04L 27/2607 |
| 2019/0208436 A1 | 7/2019 | Zhou | |
| 2019/0215896 A1 | 7/2019 | Zhou | |
| 2019/0268114 A1 | 8/2019 | Kang et al. | |
| 2019/0268961 A1* | 8/2019 | Tsai | H04W 16/28 |
| 2019/0280757 A1* | 9/2019 | Yang | H04L 5/0048 |
| 2019/0313393 A1* | 10/2019 | Wang | H04B 7/0695 |
| 2019/0327768 A1 | 10/2019 | Kim et al. | |
| 2019/0349964 A1 | 11/2019 | Liou | |
| 2020/0053710 A1 | 2/2020 | MolavianJazi | |
| 2020/0068549 A1 | 2/2020 | Kang et al. | |
| 2020/0280409 A1 | 9/2020 | Grant | |
| 2020/0351129 A1 | 11/2020 | Kwak | |
| 2021/0160022 A1 | 5/2021 | Cha | |
| 2021/0211343 A1 | 7/2021 | Baldemair | |
| 2021/0336685 A1* | 10/2021 | Cirik | H04L 1/1848 |
| 2023/0142650 A1 | 5/2023 | Miao | |

FOREIGN PATENT DOCUMENTS

| | | |
|---|---|---|
| CN | 108024365 | 5/2018 |
| KR | 10-2018-0006840 | 1/2018 |
| WO | 2017/192793 | 11/2017 |
| WO | 2018/079969 | 5/2018 |
| WO | 2018/084412 | 5/2018 |

OTHER PUBLICATIONS

Notice of Allowance for CN Application No. 201980032536.2 issued Jun. 3, 2024 and English translation, 9 pages.
Huawei et al, "Robust transmission for UL control Channel" R1-1711403, 3GPP TSG RAN WG1 NR Ad Hoc Meeting, Qingdao, China, Jun. 27-30, 2017, 2 pages.
Samsung, "Corrections on Beam Reporting and Indication" R1-1804358, 3GPP TSG RAN WG1 Meeting #92bis, Sanya, China, Apr. 16-20, 2018, 8 pages.
Huawei et al, "Introducing new MAC CEs for NR MIMO" R2-1801523, 3GPP TSG-RAN WG2 NR Ad hoc 0118, Vancouver, Canada, Jan. 22-26, 2018, 7 pages.
Sony, "Remaining issues on beam management" R1-1806563, 3GPP TSG-RAN WG1 #93, Busan, Korea, May 21-25, 2018, 5 pages.
U.S. Appl. No. 18/089,706, filed Dec. 28, 2022, Jung et al.
Office Action dated May 11, 2023 for U.S. Appl. No. 18/089,706, 23 pages.
International Search Report for PCT/KR2019/006262, mailed Sep. 6, 2019, 4 pages.
Written Opinion of the ISA for PCT/KR2019/006262, mailed Sep. 6, 2019, 5 pages.
Samsung, "Corrections on UL Beam Management", R1-1804362, 3GPP TSG RAN WG1 Meeting #92bis, Apr. 6, 2018, 9 pages.
Fujitsu, "Ambiguities about PUCCH beam indication", R1-1806120, 3GPP TSG RAN WG1 Meeting #93, May 11, 2018, 6 pages.
Huawei et al, "Remaining issues on beam management", R1-1805952, 3GPP TSG RAN WG1 Meeting #93, May 11, 2018, 8 pages.
LG Electronics, "Remaining issues on beam management", R1-1806610, 3GPP TSG RAN WG1 Meeting #93, May 12, 2018, 7 pages.
3GPP TS 38.213 V15.0.0, "Physical layer procedures for control (Release 15)", Dec. 2017, 56 pages.
Extended Search Report dated Mar. 16, 2021 in counterpart European Patent Application No. 19806703.5, 10 pages.
LG Electronics: "Discussion on beam setting for control channel and data channel", 3GPP TSG RAN WG1 Meeting #88, R1-1702452, Athens, Greece, Feb. 12, 2017; 5 pages.
Samsung: "UL beam management", 3GPP TSG RAN WG1 NR Ad-Hoc#2, R1-1710653, Qingdao, China; Jun. 26, 2017, 5 pages.
LG Electronics: "Discussion on DL/UL beam management", 3GPP TSG RAN WG1 Meeting 91, R1-1719907, Reno, USA Nov. 18, 2017; 4 pages.
Office Action for EP Application No. 19806703.5 dated Mar. 1, 2023, 5 pages.
Office Action for KR Application No. 10-2018-0059043 dated May 3, 2023 and English translation, 7 pages.
Nokia et al, R1-1716146, "PUCCH Resource Allocation and PUCCH Transmit Diversity" 3GPP TSG RAN WG1 #AH, 3GPP server publication date Sep. 11, 2017, 7 pages.
First Office Action for CN Application No. 201980032536.2 issued Oct. 17, 2023 and English translation, 18 pages.
Office Action for KR Application No. 10-2018-0059043 dated Nov. 20, 2023 and English translation, 7 pages.
Lenovo et al, R1-1715541, "Long PUCCH design for UCI of up to 2 bits" 3GPP TSG RAN WG1 Meeting NR#3, Nagoya, Japan, Sep. 18-21, 2017, 5 pages.

* cited by examiner

FIG. 4

| | 000 | 001 | 010 | 011 | 100 | 101 | 110 | 111 |
|---|---|---|---|---|---|---|---|---|
| MAC CE | 0 | 0 | 1 | 0 | 1 | 0 | 0 | 0 |

METHOD FOR TRANSMITTING AND RECEIVING UPLINK CONTROL SIGNAL AND DEVICE FOR IMPLEMENTING SAME

CROSS-REFERENCE TO RELATED APPLICATIONS

This application is a continuation of U.S. patent application Ser. No. 18/089,706 filed Dec. 28, 2022, which is a continuation of U.S. patent application Ser. No. 17/057,237 filed Nov. 20, 2020 (now U.S. Pat. No. 11,553,466), which the U.S. national phase of International Application No. PCT/KR2019/006262 filed May 24, 2019, which designated the U.S. and claims priority to KR Patent Application No. 10-2018-0059043 filed May 24, 2018, the entire contents of each of which are hereby incorporated by reference.

FIELD

The disclosure relates to a method and device for managing transmission beams by a terminal in a 5G system.

DESCRIPTION OF RELATED ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

For the 5G system, studies are being conducted to support a wider variety services than the existing 4G system. For example, the most representative services of the 5G system include an enhanced mobile broadband (eMBB) service, an ultra-reliable and low latency communication (URLLC) service, a massive machine type communication (mMTC) service, an evolved multimedia broadcast/multicast service (eMBMS), and the like. Further, a system of providing the URLLC service may be referred to as a URLLC system, and a system of providing the eMBB service may be referred to as an eMBB system. In addition, the terms service and system may be used interchangeably.

Among them, the URLLC service is newly considered in the 5G system, unlike in the existing 4G system, and requires a very high reliability (e.g., packet error rate of about $10^{-5}$) and low latency (e.g., about 0.5 msec) compared to other services. In order to satisfy such strict requirements, the URLLC service may need to apply a transmission time interval (TTI) that is shorter than that of the eMBB service, and various operating methods utilizing this are considered.

The Internet, which is a human centered connectivity network where humans generate and consume information, is now evolving to the Internet of things (IOT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

SUMMARY

With regard to basic resource information for new radio (NR) physical uplink control channel (PUCCH) transmission or beam information signaling, standardization thereof is in progress based on a radio resource control (RRC) configuration and a medium access control (MAC) control element (CE).

Meanwhile, currently, a method for standardized NR PUCCH transmission is designed in consideration of single beam transmission and is in a state that requires identification information (indication) for spatial transmission of a transmission beam (Tx beam) in order to perform PUCCH transmission in one slot. That is, there is a need for a beam configuration method for pieces of uplink control information (UCI) transmitted to a PUCCH resource subsequent to transmission of messages Msg1 to Msg4 in an initial access process.

In addition, in multiple beam or two symbol PUCCH transmission, various configuration methods are required for diversity PUCCH transmission. The disclosure proposes a basic single beam-based PUCCH beam indication, and extends the same to propose a PUCCH beam transmission configuration method that utilizes spatial beam cycling.

The technical problems to be achieved in the disclosure are not limited to the technical problems mentioned above and other technical problems not mentioned will be clearly understood by a person skilled in the art to which the disclosure belongs from the following description.

In order to solve the problem described above, a communication method by a terminal according to an embodiment of the disclosure may include: receiving, from a base station, first information related to a configuration of multiple beams for uplink control signal transmission; receiving, from the base station, second information for configuring at least one beam among the multiple beams for the uplink control signal transmission; and transmitting, to the base station, an uplink control signal by using at least one uplink beam, which is configured among multiple beams based on the first information and the second information.

Further, the first information may include: beam-related information configured for at least one of downlink transmission for transmission of a synchronization signal, downlink transmission for transmission of a reference signal, downlink transmission for transmission of a downlink control signal, and downlink transmission for transmission of a downlink data signal; and information relating to a relationship between the multiple beams for the uplink control signal transmission.

Furthermore, the second information may include at least one of: information indicating a beam set including at least one beam among multiple beams for uplink control signal transmission according to the first information; activation information indicating transmission of the uplink signal using at least one beam in the indicated beam set; and deactivation information indicating stopping of transmission of the uplink signal, and Still furthermore, the transmitting of the uplink control signal may include: receiving third information indicating some beams in the beam set; and transmitting the uplink control signal to the base station, using an uplink beam configured based on the first information, the second information, and the third information;

In addition, the first information may include information for configuring multiple time-frequency resources through which uplink control information is transmitted, and the second information may include information indicating a part of the multiple time-frequency resources, information for configuring two or more uplink beams, and information indicating transmission of the uplink control signal using the two or more uplink beams.

In order to solve the problem described above, a communication method by a base station according to an embodiment of the disclosure may include: transmitting, to a UE, first information related to a configuration of multiple beams for uplink control signal transmission; transmitting, to the UE, second information for configuring at least one beam among the multiple beams for the uplink control signal transmission; and receiving an uplink control signal transmitted by the UE using at least one uplink beam, which is configured among the multiple beams based on the first information and the second information.

Further, the receiving of the uplink control signal may include: transmitting, to the terminal, third information indicating some beams in the beam set; and receiving the uplink control signal, which is transmitted using an uplink beam configured based on the first information, the second information, and the third information.

Furthermore, in order to solve the problem described above, a terminal according to an embodiment of the disclosure may include: a transceiver; and a controller configured to receive, from a base station, first information related to configuration of multiple beams for uplink control signal transmission, to receive, from the base station, second information for configuring at least one beam among the multiple beams for the uplink control signal transmission, and to transmit, to the base station, an uplink control signal by using at least one uplink beam, which is configured among multiple beams based on the first information and the second information.

In order to solve the problem described above, a base station according to an embodiment of the disclosure may include: a transceiver; and a controller configured to transmit, to a terminal, first information related to configuration of multiple beams for uplink control signal transmission, to transmit, to the terminal, second information for configuring at least one beam among multiple beams for the uplink control signal transmission, and to receive an uplink control signal transmitted by the terminal using at least one uplink beam, which is configured among multiple beams based on the first information and the second information.

According to an embodiment of the disclosure, a method for NR PUCCH transmission may not only consider indication for single beam transmission, but also consider indication for spatial transmission of a Tx beam for PUCCH transmission within one slot. That is, according to an embodiment of the disclosure, beam configuration for pieces of UCI information transmitted to a PUCCH resource subsequent to transmission of messages Msg1 to 4 in the initial process may be performed.

Further, according to an embodiment of the disclosure, in multiple beam or 2 symbol PUCCH transmission, various configuration methods may be provided for diversity PUCCH transmission. According to an embodiment of the disclosure, a basic single beam-based PUCCH beam indication may be extended to provide a PUCCH beam transmission configuration method utilizing spatial beam cycling.

According to an embodiment of the disclosure, a PUCCH beam set-candidate may be configured through a semi-static radio resource control (RRC) message and information on a synchronous signal block (SSB)/a channel state information reference signal (CSI-RS)/a sounding reference signal (SRS) in a medium access control (MAC) control element (CE), and diversity PUCCH beam transmission is indicated using dynamic identification information, so as to reduce signaling overhead.

The effects obtainable in the disclosure are not limited to the above-mentioned effects, and other effects that are not mentioned may be clearly understood by a person skilled in the art from the following description.

BRIEF DESCRIPTION OF THE DRAWINGS

FIG. 4 illustrates an example of a MAC CE field design according to an embodiment of the disclosure;

DETAILED DESCRIPTION OF EXAMPLE EMBODIMENTS

Figure 1:
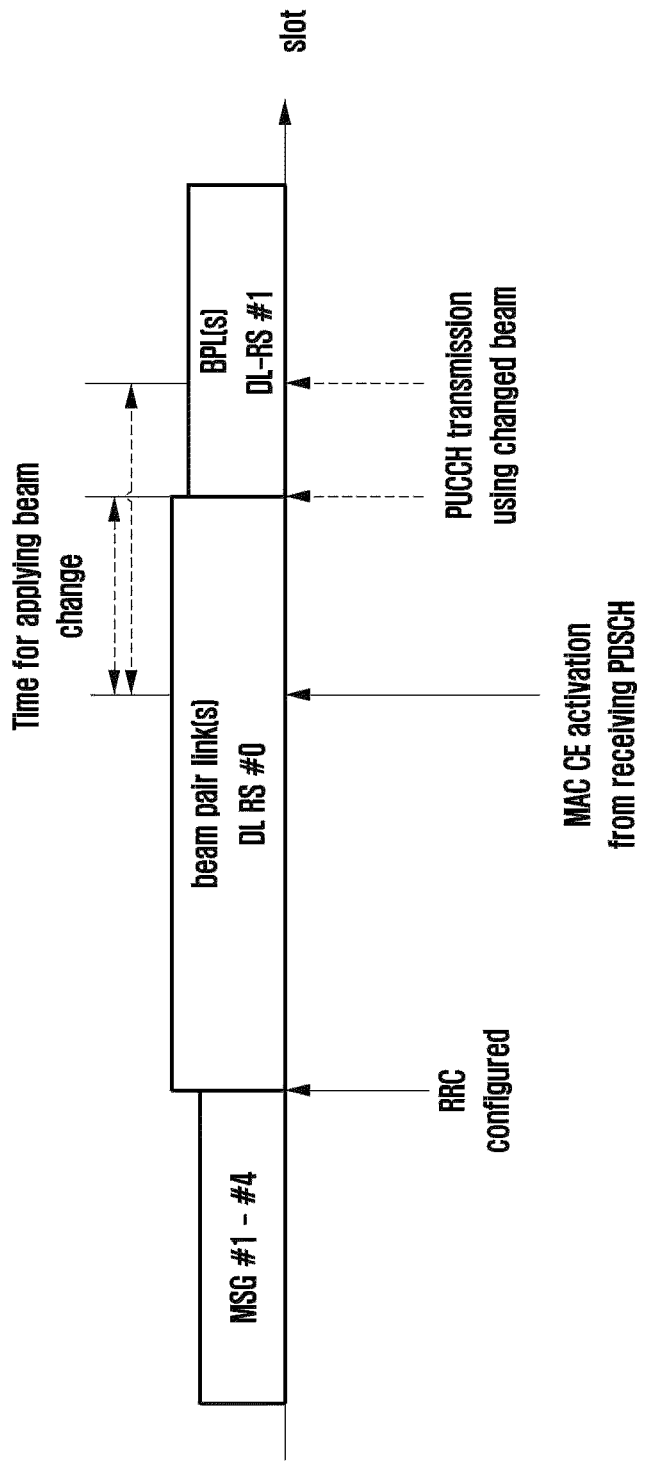
FIG. 1 illustrates an example of a method of transmitting PUCCH beam identification information according to an embodiment of the disclosure.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Specific terms used in the following description are provided to help the understanding of the disclosure, and the use of these specific terms may be changed to other forms without departing from the technical spirit of the disclosure.

A signaling method for beam designation and beam change for a physical uplink control channel (PUCCH) and a physical uplink shared channel (PUSCH) of uplink according to an embodiment of the disclosure will be described.

FIG. 1 illustrates an example of a method of transmitting PUCCH beam identification information according to an embodiment of the disclosure.

In the case of PUCCH resource sets, a UE may transmit uplink control information in the same beam direction as the beam for message 3 (Msg3) PUSCH transmission in the initial access process. In addition, the UE may transmit uplink control information to a base station by using PUCCH resources in the same beam direction as the beam in the downlink (DL).

Spatial relation information for an uplink control channel (PUCCH-SpatialRelationInfo) may be configured in the UE using a radio resource control (RRC) message.

The PUCCH-SpatialRelationInfo may include a list of configuration information of spatial relations between reference signals and a PUCCH. The reference signal may include at least one of a synchronous signal block (SSB), a channel state information reference signal (CSI-RS), and a sounding reference signal (SRS). If the PUCCH-SpatialRelationInfo includes at least one list, one list or a set of lists may be selected through a medium access control (MAC) control element (CE). Further, each element of the list may include an SSB index, non-zero power (NZP) CSI-RS resource configuration identification information (NZP-CSI-RS-ResourceConfigId), SRS resource configuration identification information (SRS-ResourceConfigId), and the like.

For example, PUCCH-SpatialRelationInfo may be shown as in <Table 1> below.

TABLE 1

| List(bit field) | Reference RS (SSB/CSI-RS/SRS) |
| --- | --- |
| 000 | SSB index #X |
| 001 | SSB index #Y |
| 010 | SSB index #Z |

TABLE 1-continued

| List(bit field) | Reference RS (SSB/CSI-RS/SRS) |
| --- | --- |
| ... | ... |
| 110 | CSI-RS index #W |
| 111 | CSI-RS index #V |

In addition, spatial relation information for SRS (SRS-SpatialRelationInfo) may be configured in the UE through a radio control channel (RRC) message.

The SRS-SpatialRelationInfo may include a list including configuration information of spatial relations between reference signals and a target SRS. The reference signal may include a synchronization signal, a CSI-RS, and an SRS. Further, each element of the list may include an SSB index, non-zero power (NZP) CSI-RS resource configuration identification information (NZP-CSI-RS-ResourceConfigId), SRS resource configuration identification information (SRS-ResourceConfigId), and the like. Here, the SSB index may have an appropriate RRC name.

In the initial access process, the UE may assume that spatial relation information, which is related to a beam for transmission of a physical random access channel (PRACH) preamble until the RRC connection is established, is identical to a default spatial relation for PUCCH and/or PUSCH transmission. In addition, in the case of a PUCCH resource configured as a system information block (SIB), the UE may apply the same beam as the Tx beam used for Msg3 transmission of the RACH.

Meanwhile, an RRC connection is established through the initial configuration process and PUCCH-SpatialRelationInfo included in the RRC message is configured in the UE. However, until at least one spatial relation is selected in the list included in the PUCCH-SpatialRelationInfo through the MAC CE, the UE may select a PUCCH transmission beam, assuming that a default spatial relation for PUCCH transmission.

Here, the default spatial relation may refer to: 1) One beam which is the same as the beam for a synchronization signal (e.g., a synchronous signal (SS)/physical broadcast channel (PBCH) block) identified by the UE in the initial access process. Alternatively, 2) The UE may assume an element (first entry) included first in the PUCCH-SpatialRelationInfo as a default spatial relation.

Referring to FIG. 1, the UE may discover an optimal beam by monitoring the SSB in the initial access process. Further, the beam for the corresponding SSB may be continuously monitored using a cell defined SSB.

The UE may transmit or receive messages Msg1 to Msg4 for initial access to or from a base station. Here, in order to transmit Msg3 to the base station, the UE may select a beam corresponding to a beam, for which a PUCCH resource for Msg3 transmission has been used in the downlink (DL), by using beam correspondence with beams used in the DL.

Thereafter, the UE may establish RRC configuration with the base station. After the RRC configuration is established, the UE may establish and maintain a beam pair link with the base station. As a method for determining the PUCCH beam, as described in the default spatial relation, 1) a beam identified (or defined) (e.g., the SS/PBCH block identified beam) in the initial access process may be continuously utilized. Alternatively, 2) in a separate RRC connection, a default configuration method by a default setting (e.g., an element (first entry) included first in PUCCH-SpatialRelationInfo) may be considered.

Then, after the RRC connection is established, the UE may configure, in the MAC CE message, at least one piece of beam configuration information of a beam configured through the RRC message. For example, when beam direction-related information is configured in the MAC CE message, the UE may configure the configured information to be applied after a predetermined period of time has passed (PUCCH transmission using changed beam). Here, it may be distinguished whether one piece of beam-related information or multiple pieces beam-related information (association information between quasi-co-located (QCL-ed) RSs) are configured in the MAC CE message. Details thereof will be described below.

Figure 2:
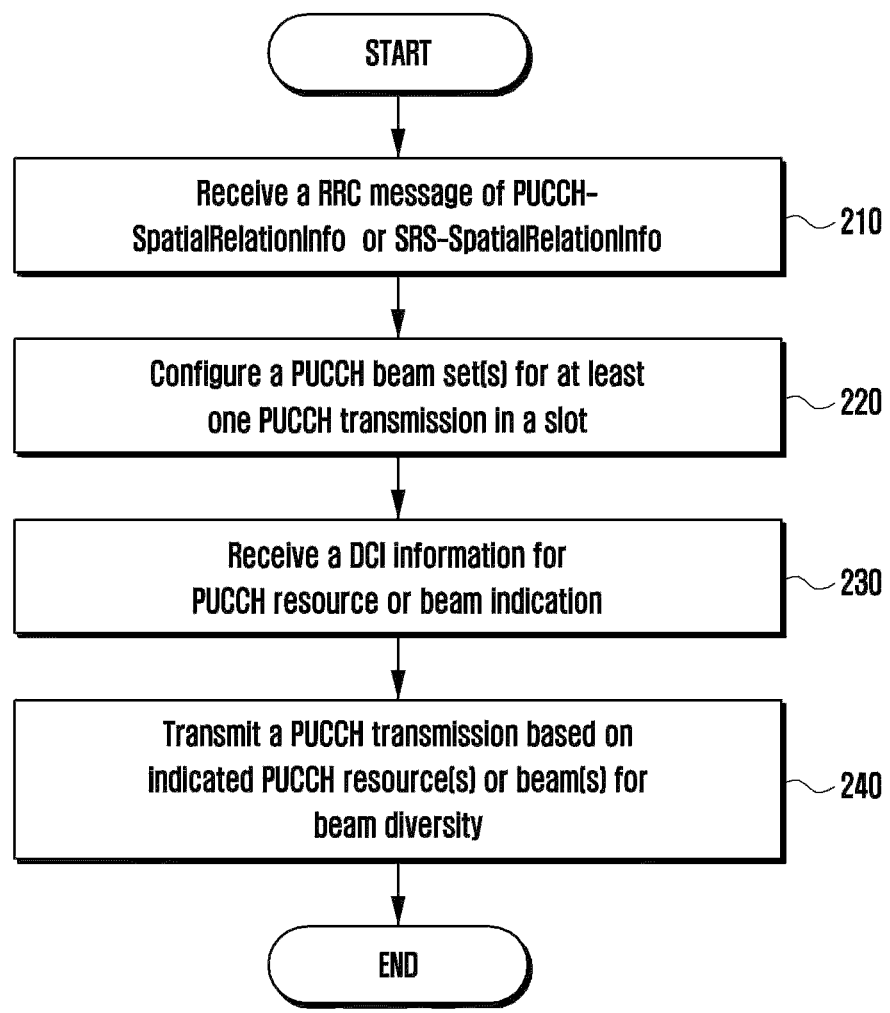
FIG. 2 illustrates an example of a beam indication and PUCCH transmission method according to an embodiment of the disclosure.

FIG. 2 illustrates an example of a beam indication and PUCCH transmission method according to an embodiment of the disclosure.

Referring to FIG. 2, in operation 210, a UE may establish an RRC connection while accessing a cell. That is, the UE may receive an RRC message from a base station, and the RRC message may include PUCCH-SpatialRelationinfo and/or SPS-SpatialRelationinfo. An uplink beam direction may be configured based on the message.

In operation 220, the UE may identify a PUCCH beam direction based on PUCCH-SpatialRelationinfo or SPS-SpatialRelationinfo. Here, the UE may configure at least one PUCCH beam or a beam set configured for PUCCH transmission together with a PUCCH resource set in which a PUCCH may be additionally transmitted into a slot from a base station during a PUCCH configuration process.

Subsequently, in operation 230, the UE may receive, using L1-signal, a message including downlink control information (DCI) for selecting at least one of a PUCCH resource set, a beam (index), or a beam set (indexes), configured in the RRC connection. Here, DCI information may designate one resource in the PUCCH resource set. In addition, information included in the DCI may include activation information indicating transmission of all or part of preconfigured beam(s) other than the index, or deactivation information indicating stopping of transmission of all or part of the configured beam(s). In addition, the DCI information may include beam-related information indicated in various forms.

According to an embodiment, the beam-related information in the DCI may include information for designating all or part of beam sets (beam candidates) configured in the RRC connection as PUCCH beams.

According to another embodiment, a UE may receive a MAC CE message including information indicating a part (for example, information for indicating one beam, two beams, four beams, eight beams) of all beam sets (beam candidates) configured in the RRC connection. Then, after receiving the MAC CE message, the UE may finally receive the DCI including the beam-related information so as to indicate the beam.

According to another embodiment, the beam-related information in the DCI may include information (for example, activation or deactivation information) indicating transmission of or stopping transmission of all or part of beam sets (beam candidates) configured through the RRC message (or MAC CE). That is, when one PUCCH beam index is already configured through the RRC message or MAC CE message at the time point at which the UE has received the DCI, the PUCCH beam may be indicated to be transmitted by referring to at least one PUCCH beam index, using 1 bit in DCI. In addition, when multiple PUCCH beam indexes are already configured through the RRC message or MAC CE message at the time point at which the UE has received the DCI, the multiple PUCCH beam indexes are indicated to be transmitted by referring to the designated multiple PUCCH beam indexes using 1 bit in the DCI. That is, the UE may determine DCI to perform multi-beam cycling or beam diversity transmission, and may transmit uplink control information based on the DCI.

The above description may be applied when the PUCCH beam index is DL-based uplink (UL) spatial beam information, and may also be applied to a method using SRS. This is further explained below.

Details of the PUCCH beam indication method will be described.

A PUCCH beam may be indicated using downlink (DL) correspondence (reciprocal QCL derivation of UL beam based on DL RS based on a downlink reference signal). That is, a relation between a DL port and a UL port is specified, and the base station (gNB) may indicate the UE to transmit an uplink signal by using UL ports, such as PUCCH/PUSCH DMRS ports that are spatially QCL-ed with uplink ports (e.g., a physical downlink shared channel (PDSCH), demodulation reference signal (DMRS), PUCCH DMRS, or general SS/CSI-RS port, etc.).

Here, a) The PUCCH beam may be a beam quasi-co-located (QCL) with the SSB. According to an embodiment, the PUCCH beam may be a beam QCL-ed with the SSB during initial access.

b) The PUCCH beam may be a beam QCL-ed with a physical downlink control channel (PDCCH) DMRS port or SSB/CSI-RS port. According to the embodiment, the same PUSCH port may be used.

c) The PUCCH beam may be a beam QCL-ed with PDSCH (a PDSCH DMRS port or SSB/CSI-RS port). According to the embodiment, the same PUSCH port may be used.

d) Alternatively, the PUCCH beam may be a beam different from beams of the SSB, PDCCH, and PDSCH currently being received (at last slot).

Meanwhile, when the base station is expected to receive a PUCCH (for example, an ACK/NACK signal) from one UE in a specific direction, it may be useful to receive the ACK/NACK signal by using a narrow beam used for transmission of the PDSCH.

In addition, when the base station is expected to simultaneously receive the PUCCH (e.g., the ACK/NACK signal) from multiple UEs in a specific direction, it may be useful to receive the ACK/NACK signal by using a relatively wider beam compared to the narrow beam.

The uplink control signal may be received by one transmission reception unit (TRP) and a data signal may be received at another TRP.

Meanwhile, the PUCCH beam using the DL correspondence may be shown as in <Table 2>.

TABLE 2

| Cases | single beam scenario | multiple beam scenario |
|---|---|---|
| SSB/PDCCH/PDSCH are transmitted through same beam | Beam-1: SSB index #X | Beam-1: SSB index #X<br>Beam-2: CSI-RS ID #Y or SRS ID #Z<br>... |
| SSB/PDCCH are transmitted through same beam | Beam-1: SSB index #X for SSB/PDCCH<br>Beam-2: CSI-RS ID #Y or SRS ID #Z for PDSCH | Beam-1: SSB index #X for SSB/PDCCH<br>(Beam-2: SSB index #X + 1 for SSB/PDCCH)<br>Beam-3: CSI-RS ID #Y or SRS ID #Z for PDSCH<br>(Beam-4: CSI-RS ID #Y + 1 or SRS ID #Z + 1 for PDSCH)<br>... |
| SSB and PDCCH are transmitted through different beams (PDSCH and PDCCH are assumed to be transmitted through same beam) | Beam-1: SSB index #X for SSB<br>Beam-2: CSI-RS ID #Y or SRS ID #Z for PDCCH/PDSCH | Beam-1: SSB index #X for SSB<br>Beam-2: CSI-RS ID #Y or SRS ID #Z for PDCCH/PDSCH<br>... |
| SSB, PDCCH, and PDSCH are transmitted through different beams | Beam-1: SSB index #X for SSB<br>Beam-2: CSI-RS ID #Y or SRS ID #Z for PDCCH<br>Beam-3: CSI-RS ID #Y... or SRS ID #Z for PDSCH | Beam-1: SSB index #X for SSB<br>Beam-2: CSI-RS ID #Y or SRS ID #Z for PDCCH<br>Beam-3: CSI-RS ID #Y or SRS ID #Z for PDSCH |

Referring to <Table 2>, when the SSB/PDCCH/PDSCH are transmitted through the same beam, the UE may select, as the PUCCH beam, a beam QCL-ed with the SSB index (#X) in a scenario of using a single beam. Further, in a scenario of using multiple beams, the UE may select, as the first beam (beam-1), a beam QCL-ed with the SSB index #X, and may select, as the second beam (beam-2), a beam QCL-ed with the CSI-RS id (#Y) or SRS id (#Z).

Further, in a scenario in which SSB/PDCCH is transmitted through the same beam, PDSCH is transmitted through another beam, and a single beam is used, the UE may select a beam QCL-ed with the SSB index (#X) as the PUCCH beam. Alternatively, the UE may select, as a PUCCH beam, a beam QCL-ed with the CSI-RS id (#Y) or SRS id (#Z) of the PDSCH.

In addition, in a scenario in which SSB/PDCCH is transmitted through the same beam, PDSCH is transmitted through different beams, and multiple beams are used, the UE may select, as the first beam (beam-1), a beam QCL-ed with the SSB index (#X) of the SSB/PDCCH. Alternatively, the UE may select, as the second beam (beam-2), a beam QCL-ed with the SSB index+1 (#X+1) of the SSB/PDCCH. Then, the UE may select, as the third beam (beam-3), a beam QCL-ed with the CSI-RS id (#Y) or SRS id (#Z) of the PDSCH. Alternatively, the UE may select, as the fourth beam (beam-4), a beam QCL-ed with the CSI-RS id+1 (#Y+1) or SRS id+1 (#Z+1) of the PDSCH.

Similarly, in a scenario in which the SSB and the PDCCH are transmitted through different beams and the PDSCH and the PDCCH are transmitted through the same beam, the UE may select, as the PUCCH beam, a beam QCL-ed with the SSB index (#X). Alternatively, the UE may select, as the PUCCH beam, a beam QCL-ed with the CSI-RS id (#Y) or SRS id (#Z) of the PDSCH/PDCCH. In addition, in a scenario of using multiple beams, the UE may select, as the first beam (beam-1), a beam QCL-ed with the SSB index (#X) of the SSB. Further, the UE may select, as the second beam (beam-2), a beam QSL-ed with the CSI-RS id (#Y) or SRS id (#Z) of the PDSCH/PDCCH.

Figure 3:
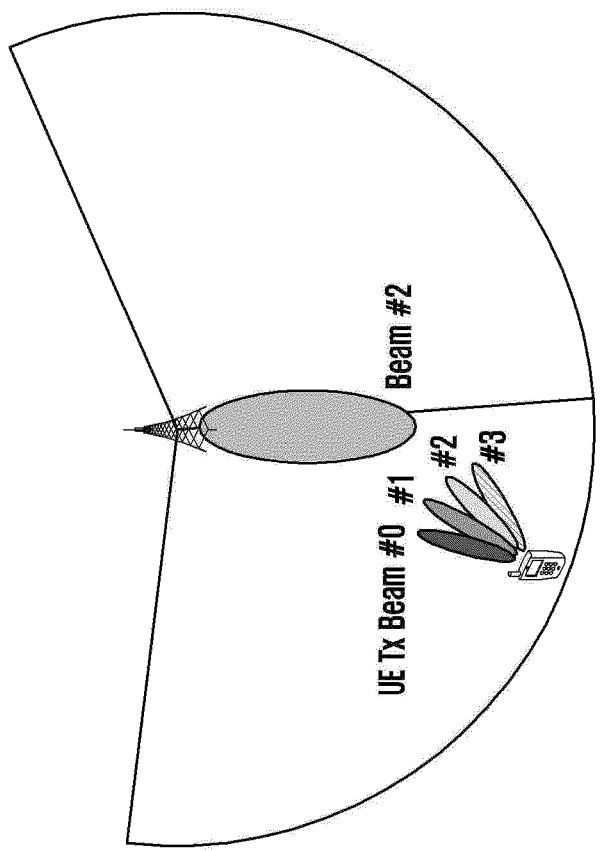
FIG. 3 is a view for explaining an example of a DCI indication method in a frequency-time resource in a PUCCH beam indication method according to an embodiment of the disclosure.
Figure 3:
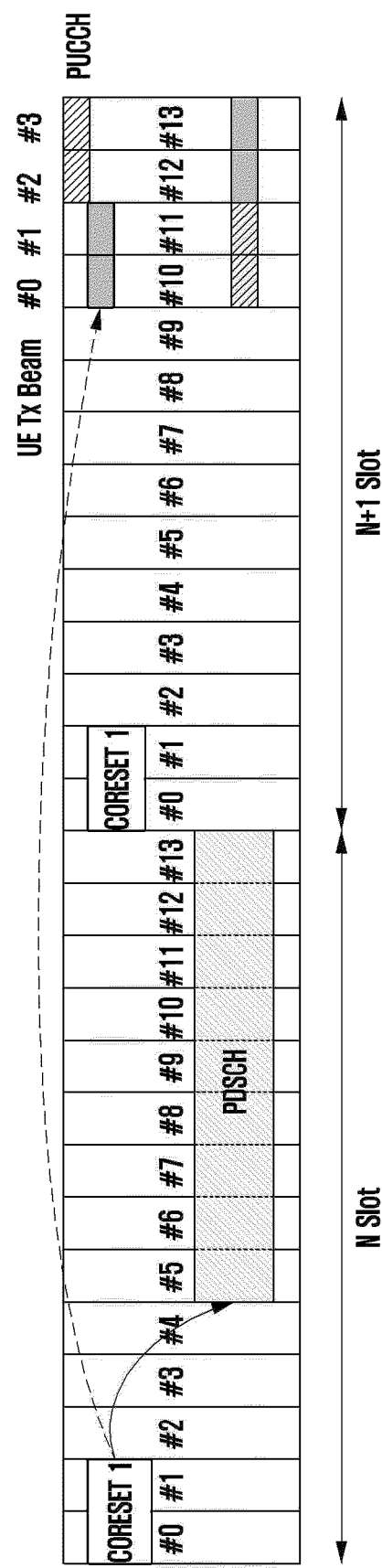

FIG. 3 is a view for explaining an example of a DCI indication method in a frequency-time resource in a PUCCH beam indication method according to an embodiment of the disclosure.

Referring to FIG. 3, in CORSET 1, the UE may perform blind decoding to detect the location and amount (e.g., #5-#13) of resources for the PDSCH. Further, in CORSET 1, the UE may additionally configure the location of the PUCCH resource (#10-#13) and the beam direction (UE Tx beam #0-#3). Alternatively, the UE may include activation information indicating transmission of all or part of (re-source) transmission in a preconfigured beam direction or deactivation information indicating stopping of transmission thereof.

In an embodiment, PUCCH resources (e.g., #10-#11) may be fixed in the same PUCCH beam direction (#0) and transmitted. As another embodiment, PUCCH resources (e.g., #10-#11) may be transmitted in different PUCCH beam directions (e.g., beam #0 and beam #1). Here, it is described that the PUCCH beam is changed for each symbol, but when there are four transmitted symbols, the PUCCH beam may be changed for every symbol or every two symbols. For example, when the PUCCH resources are #10-#13, the UE may transmit the PUCCH resources #10 and #11 through beam #0, and may transmit the PUCCH resources #12 and #13 through beam #1. Alternatively, the UE may transmit the PUCCH resources #10, #11, #12, and #13 through beams #0, #1, #2, and #3, respectively. The PUCCH beam direction may be indicated using DCI as described above, but may be preconfigured through the RRC message or MAC CE message.

The index #0 to #3 indicating the beam direction of the UE may denote the beam direction in which the UE is implemented, and may not denote the signaling direction of the base station.

Accordingly, the UE may transmit, to the base station, an ACK/NACK message relating to whether PDSCH reception from the base station has been successful or failed or other additional information (for example, channel quality information (channel quality indicator (CQI)), CSI measurement information, or beam measurement information).

Hereinafter, a detailed description of a practical RRC message configuration method and DCI structure will be provided.

A method of indicating PUCCH beam cycling (diversity PUCCH) will be described.

The SSB or reference signal (RS) for PUCCH beam cycling or diversity PUCCH may be configured, and PUCCH beam candidates may be selected using the same.

Here, the selection of the PUCCH beam candidates may be configured through the RRC message.

a) The UE may configure all PUCCH beams according to the PUCCH-SpatialRelationInfo field included in the RRC message which is received when the UE establishes RRC connection with the base station, as one PUCCH beam cycling (candidate) set (beam diversity effect). For example, if 16 beams are configured according to the PUCCH-SpatialRelationInfo field, 16 beams may be configured as one PUCCH beam cycling set.

b) According to an embodiment, the UE may configure or determine, as one PUCCH beam cycling (candidate) set, two or more beams among PUCCH beams configured according to the PUCCH-SpatialRelationInfo field included in the RRC message which is received when the UE establishes RRC connection with the base station. For example, when 16 beams are configured according to the PUCCH-Spatial-RelationInfo field, the first to the fourth beam may be configured as a first PUCCH beam cycling set, the fifth to the seventh beam may be configured as a second PUCCH beam cycling set, and the eighth to the 13th beam may be configured as a third beam cycling set, and the 14th to 16th beam may be configured as a fourth beam cycling set.

For example, the direction of a space area and the like, which is covered by the TRP at intervals of a predetermined angle (for example, considering phase shift), may be configured as one set.

In addition, multiple sets may be configured using the SSB index number #. For example, SSB index #0 and SSB index #2 may be configured as one set.

c) According to an embodiment, when higher layer parameter SRS-SpatialRelationInfo is configured, in the UE, to be set with SSB/CSI-RS/SRS, the UE may transmit SSI resources using the same spatial domain transmission filter used to receive the SSB, periodic or semi-persistent CSI-RS, or periodic SRS. That is, the UE may transmit the SRS in the beam direction used by the base station to transmit the SSB or the like through the DL. Accordingly, the UE may determine the PUCCH beam cycling (candidate) set by using the configuration (beam diversity effect). For example, when the SRS-SpatialRelationInfo is configured and thus a relationship between a resource through which the SRS is to be transmitted and a beam is established, and when a specific SRS resource index or SRS resource set index is indicated to the UE from the base station, the UE may determine, as a PUCCH beam candidate, a beam corresponding to the corresponding SRS resource index or SRS resource set index. In addition, the UE may determine, as a PUCCH beam candidate set, at least one beam which is obtained by calculating according to a preconfigured calculation method based on information relating to at least one preconfigured consecutive beam among beams corresponding to the corresponding resource index or SRS resource set index or information relating to the beam corresponding to the corresponding resource index or SRS resource set index.

The PUCCH beam candidate set according to a) to c) may be, for example, as shown in <Table 3> below.

TABLE 3

| | QCLed SSB index | Periodic CSI-RS resource (set) index | SRS resource (set) index |
|---|---|---|---|
| Two beams | Set A: #0, #2 | Set A: #0, #6 | Set A: #0, #6 |
| | Set B: #2, #4 | Set B:#2, #8 | Set B:#2, #8 |
| | Set C: #4, #6 | Set C: #4, #10 | Set C: #4, #10 |
| Three | Set E: #0, #2, #4 | Set A: #0, #6, #12 | Set A: #0, #6 |

TABLE 3-continued

|  | QCLed SSB index | Periodic CSI-RS resource (set) index | SRS resource (set) index |
|---|---|---|---|
| beams | Set F: #2, #4, #6<br>Set G: #4, #6, #8 | Set B:#2, #8, # 14<br>Set C: #4, #10, # 16 | Set B:#2, #8<br>Set C: #4, #10 |

Referring to <Table 3>, when two beams are included in the PUCCH candidate beam set, set A may include beams QCL-ed with SSB indexes #0 and #2, set B may include beams QCL-ed with SSB indexes #2 and #4, and set C may include beams QCL-ed with SSB indexes #4 and #6. Here, the index configuration may be configured through modulo calculation of the total number of SSBs, or incremental numbering may be configured. Alternatively, set A may include beams corresponding to a periodic CSI-RS resource index or resource set indexes #0 and #6, set B may include beams corresponding to a periodic CSI-RS resource index or resource set indexes #2 and #8, and set C may include beams corresponding to a periodic CSI-RS resource index or resource set indexes #4 and #10. Alternatively, beams corresponding to the SRS resource index or resource set index may be included in the PUCCH candidate beam set.

Meanwhile, a design for grouping transmission configuration indication (TCI) states can be established by mapping UL RS as well as SSB and DL RS in the TCI states. For example, grouping can be performed in two, three, or n units in the TCI states. <Table 4> shows an example of grouping of TCI states and PUCCH candidate beam sets.

TABLE 4

| TCI-states | RS set | QCL type | UL RS |
|---|---|---|---|
| 0000 | SSB index #0 | Type-A | SRS #0 |
| 0001 | SSB index #1 | Type-A | SRS #0 |
| 0010 | CSI-RS resource (set) index #0 | Type-A | SRS #1 |
| 0011 | CSI-RS resource (set) index #1 | Type-D | SRS #1 |
| . . . | . . . | . . . | . . . |
| 1111 | CSI-RS resource (set) index #12 | Type-D | SRS #n |

For example, in the case of <Table 4>, when "0000" is designated as the TCI-state, a PUCCH beam corresponding to SRS #0 may be configured as a PUCCH candidate beam set, and when "00011" is designated, a PUCCH beam corresponding to SRS #1 may be configured as a PUCCH candidate beam set.

Meanwhile, the sequence of transmission of multiple PUCCH beams to the base station may be configured through the RRC message as follows, for example. The SSB index may be transmitted prior to the CSI-RS id. Alternatively, the transmission may be performed in a sequence of increasing or decreasing index numbers. Alternatively, the transmission may be performed in a sequence of the lowest or highest set number order or lower or highest index number order. Alternatively, the sequence of transmission may be configured such that a PUCCH beam corresponding to a designated default index is to be transmitted first while the transmission thereafter follows least one of the sequences described above.

In addition, the selection of the PUCCH beam candidate may be configured through the MAC CE message.

Figure 4:
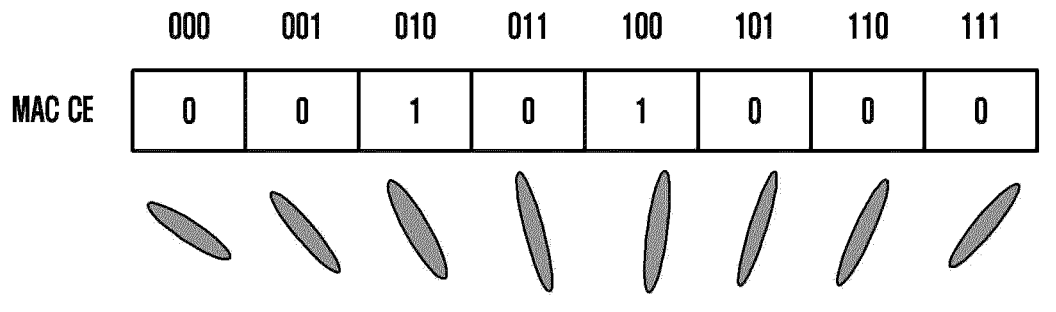

FIG. 4 illustrates an example of a MAC CE field design according to an embodiment of the disclosure.

Among all PUCCH beams according to a PUCCH-SpatialRelationInfo field configured by a UE and a base station in an RRC connection process, the UE may designate at least one PUCCH beam in the PUCCH-SpatialRelationInfo field using the MAC CE received through the PDSCH.

a) Here, the MAC CE may directly configure two or more beams in the form of bit width in the PUCCH beam cycling (candidate) set. Referring to FIG. 4, the MAC CE includes bit information capable of designating the first to the eighth PUCCH beam. In this case, when MAC CE indicates "010" and "100", the UE may configure a third PUCCH beam and a fifth PUCCH beam as a PUCCH beam cycling set.

b) According to an embodiment, one PUCCH beam cycling (candidate) set may be directly configured in the form of bit width or the corresponding one PUCCH beam index may be configured by the MAC CE. Further, the UE may calculate additional PUCCH cycling candidate beams.

According to an embodiment, the id of the additional PUCCH cycling candidate beam may be configured through modulo calculation of the total number of SSBs. As another embodiment, the SSB index, CSI-RS resource index, or CSI-RS resource set index may be configured through incremental numbering. That is, the configured id number (n) may be (n+2), (n+4), or (n+k) (here, k=2(1-1), 1 is the number of cycling beams through which PUCCH is transmitted).

c) According to an embodiment, SRS-SpatialRelationInfo configured through the RRC message may be utilized. Here, the corresponding SRS id(s) may be included in the MAC CE configuration for semi-persistent SRS transmission. Further, based on the SRS id(s) included in the MAC CE, the UE may perform PUCCH beam cycling transmission using the same spatial domain transmission filter used to receive SSB/periodic or semi-persistent CSI-RS/periodic SRS.

When the UE receives the MAC CE through the PDSCH, the UE may continuously perform PUCCH beam cycling if PUCCH resources are allocated from DCI after receiving the MAC CE even without receiving separate DCI.

Meanwhile, the sequence of transmission to the base station of multiple PUCCH beams, which are configured through the RRC message and designated by using a bit width of the MAC CE, may be as follows, for example. In an embodiment, transmission may be performed in increasing sequence from the lowest field number (value) designated by the MAC CE. In the case of FIG. 4, a third beam corresponding to "010" may be transmitted first. In another embodiment, the transmission may be performed in decreasing sequence from the highest field number designated by in MAC CE. In the case of FIG. 4, a fifth beam corresponding to "100" may be transmitted first. Alternatively, the SSB index may be transmitted prior to the CSI-RS id. Alternatively, the transmission may be performed in a sequence of increasing or decreasing id numbers. Alternatively, the transmission may be performed in a sequence of the lowest or highest set number order or lower or highest index number order. Alternatively, the sequence of transmission may be configured such that a PUCCH beam corresponding to a designated default index is to be transmitted first while the transmission thereafter follows least one of the sequences described above.

Further, PUCCH beam cycling may be deactivated using the MAC CE message. For example, PUCCH beam cycling may be deactivated or activated by using at least one field of the PUCCH beam bit width of the MAC CE. Deactivation of PUCCH beam cycling may be indicated using the lowest index or the highest index of the MAC CE in the PUCCH beam bit width field of the MAC CE.

According to an embodiment, when PUCCH beam cycling is activated by the MAC CE, deactivation of PUCCH beam cycling may be operated based on a timer or a transmission count. In this case, activate or deactivate operation through DCI, which will be described later, may be omitted.

According to an embodiment, deactivation of PUCCH beam cycling may be indicated using DCI. Details thereof will be described below.

When the PUCCH beam configuration is determined using the RRC message or the MAC CE message (for example, using PUCCH-SpatialRelationInfo or SRS-SpatialRelationInfo) as described above, a beam cycling (change) operation, that is, activation or deactivation of PUCCH beam cycling may be indicated (on/off or toggle scheme may be used according to an embodiment) using one bit in group common DCI (DCI Format 2_0) for PUCCH resource allocation in DCI or common DCI (cell-specific, DCI format 1_0 or DCI format 1_1). Alternatively, in DCI format 2_3, activation/deactivation of PUCCH beam cycling may be additionally configured in an SRS request 0 or 2 bit width field. For example, when PUCCH beam cycling activation is indicated by group common DCI, UEs included in the same group which has received the group common DCI may perform PUCCH beam cycling.

According to an embodiment, by using DCI 1 bit for every slot, PUCCH beam cycling activation may be dynamically indicated using "1" (or "0") and PUCCH beam cycling deactivation may be dynamically indicated using "0" (or "1").

According to another embodiment, PUCCH beam cycling may be activated using DCI 1 bit ("1"), and PUCCH beam cycling may be deactivated using DCI 1 bit ("0") at a deactivation time point.

According to another embodiment, PUCCH beam cycling deactivation may be indicated using the configured DCI format or group common PUCCH (DCI format 2_0).

When the PUCCH beam is configured through the RRC message or the MAC CE message as described above, the PUCCH beam cycling or the PUCCH beam may be indicated at the time of subsequent PUCCH resource allocation by the DCI. Here, in the TCI-states or TCI-states-PDCCH, a set index, in which state IDs or multiple TCI-states/TCI-state-PDCCHs are configured as a set, may be utilized.

Meanwhile, when PUCCH beam cycling is activated by DCI, the sequence of transmitting multiple PUCCH beams to a base station may be based on the sequence of transmitting multiple PUCCH beams configured by the above-described RRC message to the base station or the sequence of transmission to the base station of multiple PUCCH beams, which are configured through the RRC message and designated by using a bit width of the MAC CE. Alternatively, the PUCCH beam configured in the lowest resource block (RB) number of the PUCCH resource may be transmitted first. Further, in the case of the same PUCCH resource RB, the transmission sequence of the PUCCH beam may not be considered. Further, when the ID is designated in the TCI-state, the transmission sequence of the PUCCH beam may be determined using the lowest/highest TCI states index. Alternatively, PUCCH beams may be transmitted in a designated TCI-state id sequence.

Meanwhile, a UE, which is successful in DCI decoding, when the PUCCH beam cycling is activated in DCI, may transmit uplink control information through a PUCCH resource (e.g., PUCCH resource #5) scheduled in DCI while changing the PUCCH beam. As a result, the UE may transmit information, such as ACK/NACK, CQI, SR, CSI, CRI, and the like, to SSB index #0-PUCCH resource #5 and SSB index #1-PUCCH resource #5.

According to a method of applying the PUCCH beam in the case of performing PUCCH retransmission, when the location of the PUCCH resource for PUCCH retransmission is changed from the resource location of the PUCCH initial transmission, retransmission may be performed in the sequence of cycling the initial PUCCH beam (or in reverse sequence).

In addition, when the location of the PUCCH resource for PUCCH retransmission is not changed from the resource location of the PUCCH initial transmission, in the case of PUCCH retransmission, retransmission may be performed in the sequence in which the initial PUCCH beam is cycled (or in reverse sequence). Alternatively, according to an embodiment, in the case of PUCCH retransmission, retransmission may be sequentially performed from the next beam following the initial beam designated for initial PUCCH beam cycling. Alternatively, PUCCH beam retransmission may be performed in the remaining sequences transmitted from the priority of a total of beams.

Meanwhile, SRS index-based PUCCH beam cycling transmission using the determined SRS-SpatialRelationInfo may be performed. In addition, PUCCH retransmission may be performed based on the sequence in which SRS-SpatialRelationInfo updated in MAC CE is configured (or in reverse sequence). Alternatively, in the case of PUCCH retransmission, PUCCH beam retransmission may be sequentially performed from the next beam following the initial beam designated for initial PUCCH beam cycling.

When PUCCH transmission is scheduled during multiple slots, the UE may perform PUCCH beam transmission in a sequence configured for every slot. Alternatively, according to an embodiment, the UE may perform PUCCH transmission while changing beams until PUCCH beam cycling is completed. For example, when PUCCH transmission is scheduled in the first slot and the second slot, and the PUCCH beam is configured as #0 and #1, the UE may transmit the PUCCH of the first slot while beam cycling with PUCCH beams #0 and #1, and may transmit the PUCCH of the second slot while beam cycling with PUCCH beams #0 and #1. Alternatively, the UE may transmit the PUCCH of the first slot using PUCCH beam #0, and may transmit the PUCCH of the second slot using PUCCH beam #1. In the above description, the index indicating the PUCCH beam direction is an index for implementation of the UE or convenience of explanation, and the actual transmission direction may be configured as a DL RS resource (set) index or SRS resource (set) index as described above.

Figure 5:
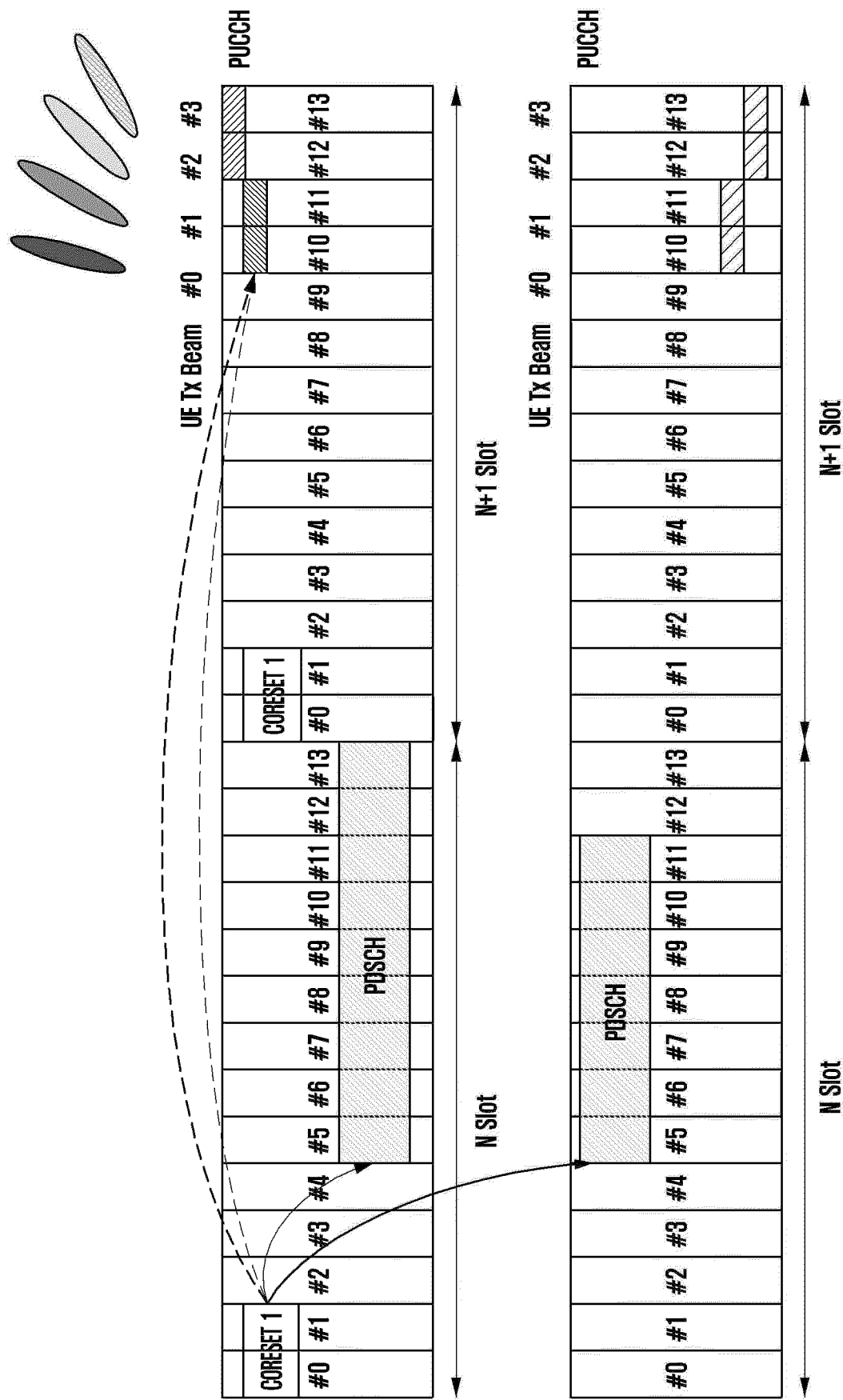
FIG. 5 illustrates an example of PUCCH beam transmission in the case of carrier aggregation according to an embodiment of the disclosure.

FIG. 5 illustrates an example of PUCCH beam transmission in the case of carrier aggregation according to an embodiment of the disclosure.

A reciprocal QCL relation between downlink CSI-RS/SSB ports of the same or different carrier aggregation (CA)/bandwidth part (BWP) and uplink PUCCH beam may be established. In this case, DCI scheduling a PUCCH resource allocates the PUCCH resource to the same resource as illustrated in FIG. 5, and if there is no separate signaling, the RS of the PCell may be assumed to be QCL-ed with the RS of the SCell and be transmitted through the PUCCH using the same beam.

Meanwhile, the UE may or may not support an operation of PUCCH transmission while changing a beam during multiple consecutive symbols according to UE capability or UE feature (including a single CC/multiple CCs).

In the case of a single CC, a UE supporting the PUCCH transmission may perform beam transmission for the signaling in one antenna module. Alternatively, the UE may perform PUCCH transmission through at least two or more antenna modules. For example, a first symbol may be transmitted through a first antenna module, and the remaining second symbols following the first symbol may be transmitted through a second antenna module. The operation of the UE may be implemented in a state not being recognized by a base station. A sweeping operation in the antenna module may reduce a delay required to set the PA and AGC in the UE. Further, the sweeping operation may be applied to multiple CCs/BWPs. For example, the PUCCH of the first CC may be transmitted to the first antenna module, and the PUCCH of the second CC may be transmitted to the second antenna module.

Meanwhile, when a beam failure occurs in at least one SCell, the UE may inform the base station that the beam failure has occurred. That is, when beam failure occurs in at least one SCell, in order to recover beam failure for the at least one SCell in which beam failure has occurred, the UE may transmit a message including information indicating that a beam failure event has occurred to the base station, by using a dedicated scheduling request (SR) resource that is part of the PUCCH resource of the PCell or a separate dedicated PUCCH resource. The message may be included in the dedicated PUCCH resources in a 1-bit form, or may be transmitted based on sequence-based short PUCCH resources. According to an embodiment, a message including information indicating that the beam failure event has occurred may be a beam failure recovery request (BFRQ) message.

When the at least one SCell is configured in the base station, the UE may notify the base station of an event in which beam failure detection (BFD) occurs only in the SCell, without including, in the beam failure recovery request (BFRQ) message, information indicating that a beam failure occurs in a specific SCell. The dedicated SR resource or a separate dedicated PUCCH resource may be configured based on a period or transmission time point configured by the base station and thus correspond to resources for transmission of a scheduling request (SR) message for BFRQ purposes, and the SR message for BFRQ purposes may be distinguished from a message of a scheduling request (SR) requesting a general PUSCH resource.

If the UE transmits a BFRQ message to the base station based on the dedicated SR resource configured by the base station or the separate dedicated PUCCH, the base station may allocate the PUSCH resource of the PCell to the UE in a subsequent slot in the case of successfully receiving the BFRQ message. Here, the UE may transmit, to the base station, additional information relating to beam failure from the PUSCH resource allocated by the base station. The message including the additional information may be a BFRQ event delivery message.

In the case where the UE identifies a new replacement/candidate beam after the beam failure detection process, the additional information may include corresponding new beam information. If the UE fails to identify the replacement/candidate beam, the new beam information may be omitted. The new beam information may be an index of a candidate beam. The index of the candidate beam may be, for example, the index of DL-RS. Referring to <Table 5>, specifically, the DL-RS index may include at least one of a SS/PBCH block resource index (SSBRI), a CSI-RS resource index (CRI), an index of a SSBRI set (or SSBRI group), an index of a CSI-RS resource index (CSI) set (or an index of a CRI group), and the like. As another example, the base station may report to the UE using the transmission configuration indication (TCI) state index for the PDCCH or PDSCH based on a preconfigured DL. As another example, the SRI may be used as the index of the UL-RS. In still another example, PUCCH spatial relation info can be utilized.

In addition, the additional information may include failed CC index information of a SCell in which beam failure detection (BFD) has occurred. For the identification of the beam failure detection, when the L1-RSRP value of the SSB resource or the CSI-RS resource in the received CC is maintained at a threshold value or below for a predetermined period of time, the UE may identify that the beam failure of the CC has occurred. Here, if the identified CC includes a MAC CE message, the SCell index may be configured as shown in <Table 5> below. The SCell index (CC index) in which the beam failure has occurred may be directly displayed in a binary number or a bit mapped to a specific location may be indicated as "1" (or "0"). In addition, the maximum number of failed CC indexes of the SCell may be smaller than or equal to the number of SCells supported by UE capability supported by the UE.

Alternatively, according to an embodiment, the additional information may be configured in a form of being piggybacked to the first, the middle, or the last of a PUSCH data message.

The PUSCH resource for transmitting the additional information has been described as a resource allocated separately by the SR message for BFRQ purposes. However, according to an embodiment, the UE may transmit the additional information to the base station in PUSCH resources for general data transmission. For example, if the PUSCH resource allocated according to the SR message for the BFRQ purpose is later than the PUSCH resource for general data transmission, the UE may transmit the additional information from the PUSCH resource for general data transmission to the base station. For another example, if the PUSCH resource allocated according to the SR message for the BFRQ purpose is commonly configured to be the same as the PUSCH resource for general data transmission, the UE may transmit the additional information to the base station together with the data from the PUSCH resource configured in common.

TABLE 5

| | SCell index (CC index) | | | | | | | |
|---|---|---|---|---|---|---|---|---|
| | $C_7$ | $C_6$ | $C_5$ | $C_4$ | $C_3$ | $C_2$ | $C_1$ | R |
| SSBRI/CRI | R | R | 0 | 0 | 0 | 0 | 0 | 0 |
| | SCell index (CC index) | | | | | | | |
| | $C_7$ | $C_6$ | $C_5$ | $C_4$ | $C_3$ | $C_2$ | $C_1$ | R |
| TCI states index | R | 0 | 0 | 0 | 0 | 0 | 0 | 0 |

Figure 6:
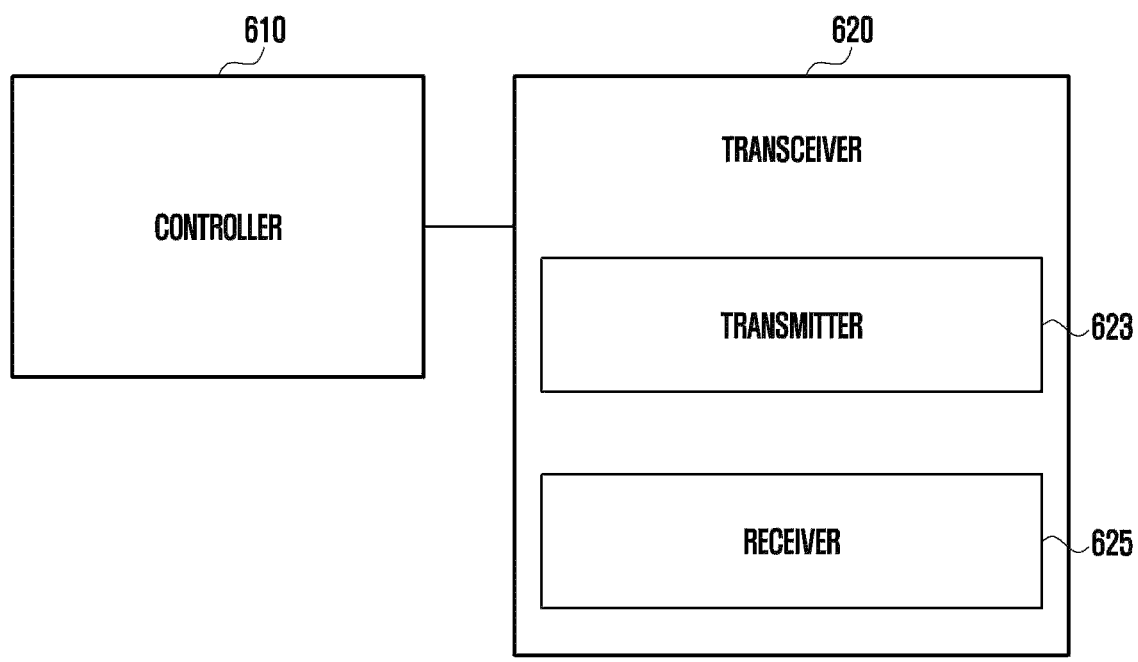
FIG. 6 is a block configuration diagram of a UE according to an embodiment of the disclosure.

FIG. 6 is a block configuration diagram of a UE according to an embodiment of the disclosure.

Referring to FIG. 6, a UE according to an embodiment of the disclosure may include a transceiver 620 and a controller 610 that controls the overall operation of the UE. In addition, the transceiver 620 may include a transmitter 623 and a receiver 625.

The controller 610 of the UE controls the UE to perform operations of one of the above-described embodiments. For example, the controller 610 of the UE may receive, from a base station, first information related to the configuration of multiple beams for uplink control signal transmission, may receive, from the base station, second information for configuration of at least one beam among multiple beams for the uplink control signal transmission, and may transmit an uplink control signal to the base station, using an uplink beam configured based on the first information and the second information.

Further, the transceiver 620 of the UE may transmit or receive signals according to operations of one of the above-described embodiments.

Meanwhile, the controller 610 and the transceiver 620 are not necessarily implemented as separate modules, and may be implemented as a single element in the form of a single chip. In addition, the controller 610 and the transceiver 620 may be electrically connected to each other.

For example, the controller 610 may be a circuit, an application-specific circuit, or at least one processor. Further, operations of the UE may be realized by providing a memory device (storage) for storing the corresponding program code in an arbitrary element in the UE. That is, the controller 610 may execute the operations described above by reading out and executing the program code stored in the memory device by a processor, a central processor (CPU), and the like.

Figure 7:
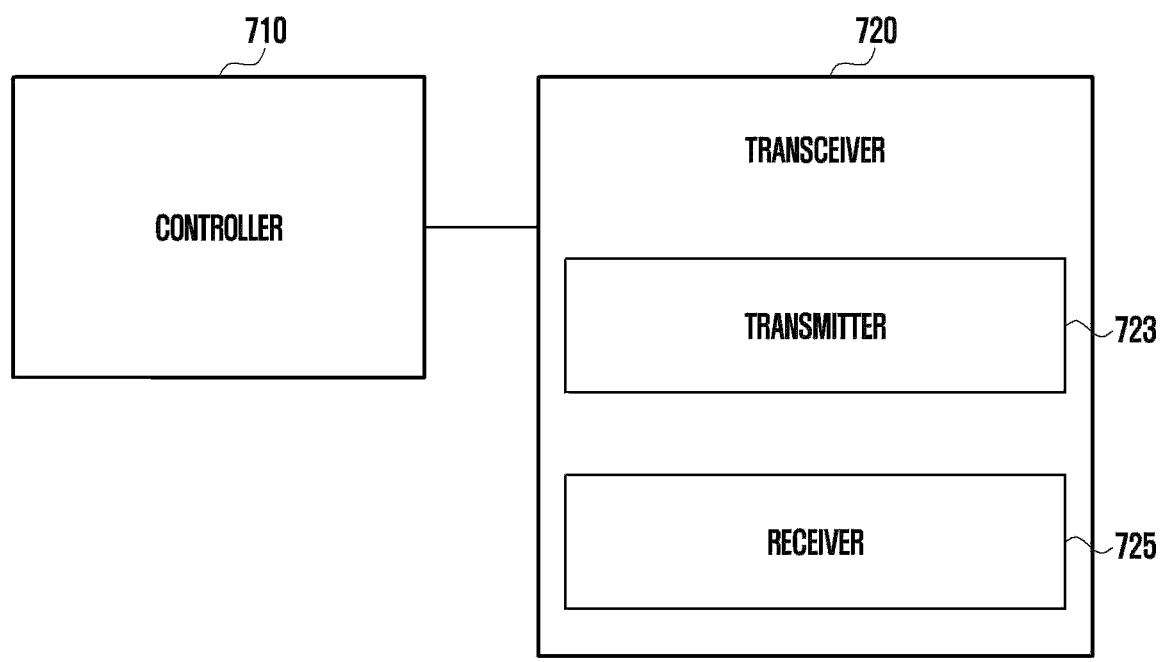
FIG. 7 illustrates the configuration of a base station according to an embodiment of the disclosure.

FIG. 7 is a block configuration diagram of a base station according to an embodiment of the disclosure.

Referring to FIG. 7, a base station according to an embodiment of the disclosure may include a transceiver 720 and a controller 710 that controls overall operations of the base station. In addition, the transceiver 720 may include a transmitter 723 and a receiver 725.

The controller 710 of the base station controls the base station to perform operations of one of the above-described embodiments. For example, the controller 710 of the base station may transmit, to a UE, first information related to configuration of multiple beams for uplink control signal transmission, may transmit, to the UE, second information for configuration of at least one beam among multiple beams for the uplink control signal transmission, and may receive an uplink control signal, which is transmitted by the UE using an uplink beam configured based on the first information and the second information.

Further, the transceiver 720 of the UE may transmit or receive signals according to operations of one of the above-described embodiments.

Meanwhile, the controller 710 and the transceiver 720 are not necessarily implemented as separate modules, and may be implemented as a single element in the form of a single chip. In addition, the controller 710 and the transceiver 720 may be electrically connected to each other.

Further, for example, the controller 710 may be a circuit, an application-specific circuit, or at least one processor. In addition, operations of the base station may be realized by providing a memory device (storage) for storing the corresponding program code at an arbitrary element in the UE. That is, the controller 710 may execute the operations described above by reading out and executing the program code stored in the memory device by a processor, a central processor (CPU), and the like.

Figure 8:
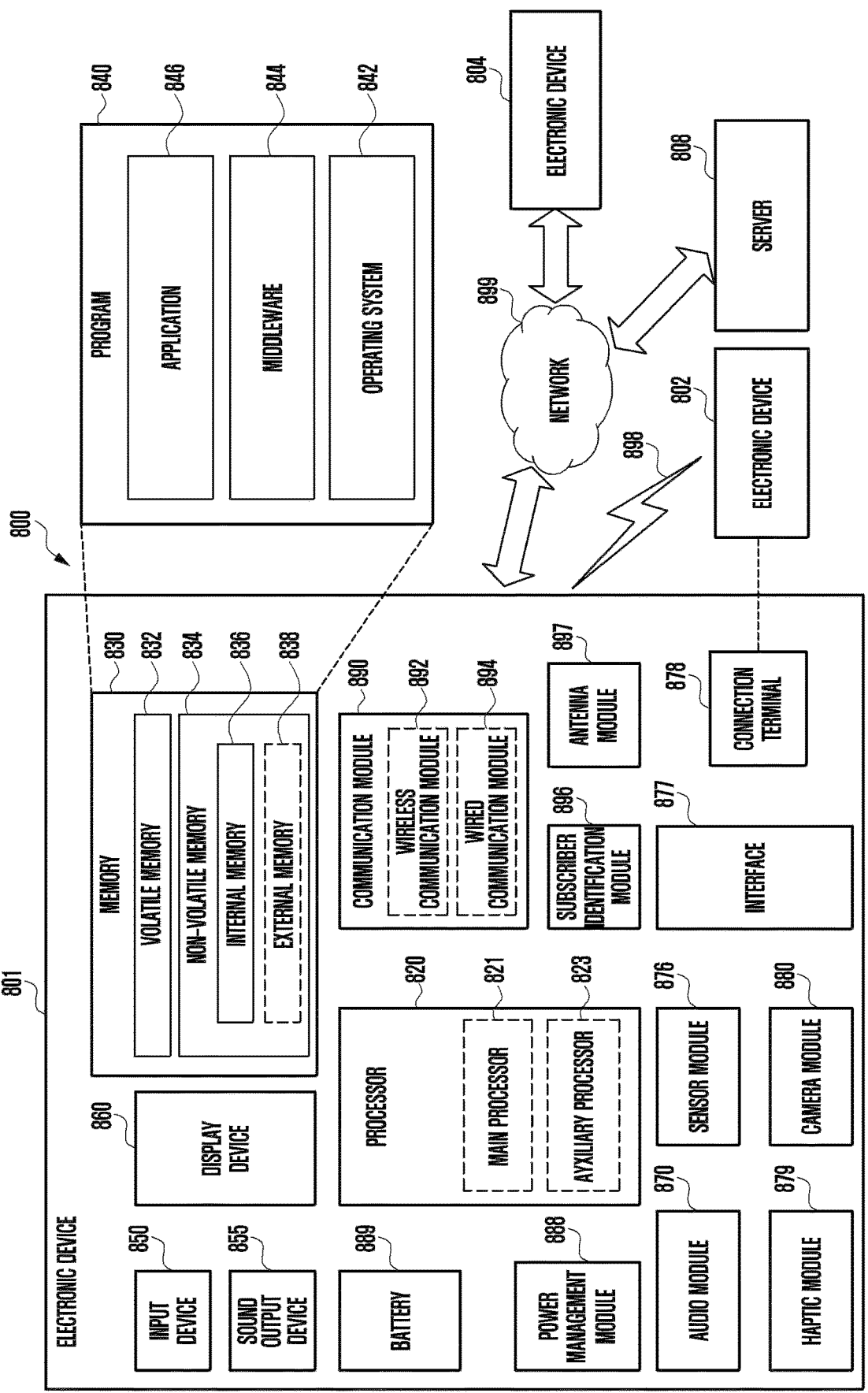
FIG. 8 is a block diagram of an electronic device in a network environment according to various embodiments.

FIG. 8 is a block diagram of an electronic device in a network environment according to various embodiments.

FIG. 8 is a block diagram of an electronic device 801 in a network environment 800 according to various embodiments. The electronic device 801 illustrated in FIG. 8 may be an example of the configuration of a UE illustrated in FIG. 6.

Referring to FIG. 8, in a network environment 800, the electronic device 801 may communicate with an electronic device 802 through a first network 898 (e.g., a short-range wireless communication network), or may communicate with an electronic device 804 or a server 808 through the second network 899 (e.g., a remote wireless communication network). According to an embodiment, the electronic device 801 may communicate with the electronic device 804 through the server 808. According to an embodiment, the electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module 896, or an antenna module 897. In some embodiments, at least one (for example, the display device 860 or the camera module 880) of the elements may be omitted, or one or more other elements may be added to the electronic device 801. In some embodiments, some of these elements may be implemented as one integrated circuit. For example, the sensor module 876 (e.g., a fingerprint sensor, an iris sensor, or an illuminance sensor) may be embedded in the display device 860 (e.g., a display).

The processor 820 may execute, for example, software (e.g., the program 840) to control at least one other element (e.g., a hardware or software element) of the electronic device 801 connected to the processor 820, and may perform various data processing or operations. According to an embodiment, as at least a part of data processing or operation, the processor 820 may load, in a volatile memory 832, instructions or data received from other elements (e.g., the sensor module 876 or the communication module 890), process instructions or data stored in a volatile memory 832, and store the resulting data in a nonvolatile memory 834. According to an embodiment, the processor 820 may include a main processor 821 (e.g., a central processor or an application processor), and an auxiliary processor 823 (e.g., a graphics processor, an image signal processor, a sensor hub processor, or a communication processor) that may be operated independently of or together with the main processor. Additionally or alternatively, the auxiliary processor 823 may be configured to use less power than the main processor 821, or to be specialized for a designated function. The auxiliary processor 823 may be implemented separately from or may be implemented as part of the main processor 821.

The auxiliary processor 823 may control, for example, at least a part of a function or states associated with at least one element (e.g., the display device 860, the sensor module 876, or the communication module 890) among the elements of the electronic device 801, instead of the main processor 821 while the main processor 821 is in an inactive (e.g., sleep) state, or together with the main processor 821 while the main processor 821 is in an active state. According to an embodiment, the auxiliary processor 823 (e.g., an image signal processor or a communication processor) may be implemented as a part of any other element (e.g., the camera module 880 or communication module 890) which is functionally associated with the auxiliary processor 823.

The memory 830 may store various data used by at least one element of the electronic device 801 (e.g., the processor 820 or the sensor module 876). The data may include, for example, software (e.g., the program 840) and input data or output data associated with a command of the software. The memory 830 may include the volatile memory 832 or the nonvolatile memory 834.

The program 840 may be stored, as software, in the memory 830, and may include, for example, an operating system 842, a middleware 844, or an application 846.

The input device 850 may receive commands or data to be used by an element (e.g., the processor 820) of the electronic device 801 from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes such as multimedia playback or recording playback, and the receiver may be used to receive an incoming call. According to an embodiment, the receiver may be implemented separately from the speaker, or may be implemented as a part thereof.

The display device 860 may visually provide information to the outside (e.g., a user) of the electronic device 801. The display device 860 may include, for example, a display, a hologram device, or a projector and a control circuit for controlling the device. According to an embodiment of the disclosure, the display device 860 may include touch circuitry configured to sense a touch, or sensor circuitry (e.g., a pressure sensor) configured to measure the strength of force generated by the touch.

The audio module 870 may convert sound into an electrical signal, or reversely, may convert the electrical signal into sound. According to an embodiment, the audio module 870 may obtain sound through the input device 850, or may output sound through the sound output device 855 or an external electronic device (e.g., the electronic device 802 (e.g., a speaker or headphones)) directly or wirelessly connected to the electronic device 801.

The sensor module 876 may detect an operating state (e.g., power or temperature) of the electronic device 801, or an external environmental state (e.g., a user state), and may generate an electrical signal or data value corresponding to the detected state. According to an embodiment, the sensor module 876 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more designated protocols that may be used to directly or wirelessly connect the electronic device 801 with an external electronic device (e.g., the electronic device 802). According to an embodiment, the interface 877 may include, for example, a high definition multimedia interface (HDMI), a universal serial bus (USB) interface, an SD card interface, or an audio interface.

A connection terminal 878 may include a connector through which the electronic device 801 may be physically connected to an external electronic device (e.g., the electronic device 802). According to an embodiment, the connection terminal 878 may include, for example, an HDMI connector, a USB connector, an SD card connector, or an audio connector (e.g., a headphone connector).

A haptic module 879 may convert electrical signals into mechanical stimulus (e.g., vibration or movement) or electrical stimulus that the user may perceive through the sense of touch or the sense of movement. According to an embodiment, the haptic module 879 may include, for example, a motor, a piezoelectric element, or an electrical stimulation device.

The camera module 880 may capture still images and videos. According to an embodiment, the camera module 880 may include one or more lenses, image sensors, image signal processors, or flashes.

The power management module 888 may manage power supplied to the electronic device 801. According to an embodiment, the power management module 888 may be implemented, for example, as at least a part of a power management integrated circuit (PMIC).

The battery 889 may supply power to at least one element of the electronic device 801. According to an embodiment, the battery 889 may include, for example, a non-rechargeable primary cell, a rechargeable secondary cell, or a fuel cell.

The communication module 890 may support establishment of a direct (e.g., wired) communication channel or a wireless communication channel between the electronic device 801 and an external electronic device (e.g., the electronic device 802, the electronic device 804, or the server 808), and may support performing communication through the established communication channel. The communication module 890 may include one or more communication processors which are operated independently of the processor 820 (e.g., an application processor) and supports direct (e.g., wired) communication or wireless communication. According to an embodiment, the communication module 890 may include a wireless communication module 892 (e.g., a cellular communication module, a short-range wireless communication module, or a global navigation system (GNSS) communication module) or a wired communication module 894 (e.g., a local area network (LAN) communication module, or a power line communication module). A corresponding communication module among these communication modules may communicate with external electronic devices through a first network 898 (e.g., a short-range communication network such as Bluetooth, Wi-Fi direct, or infrared data association (IrDA)) or the second network 899 (e.g., a long distance communication network such as a cellular network, the Internet, or a computer network (e.g., a LAN or WAN)). These various types of communication modules may be integrated into a single element (e.g., a single chip), or may be implemented as multiple separate elements (e.g., multiple chips). The wireless communication module 892 may identify and authenticate the electronic device 801 within a communication network such as the first network 898 or the second network 899, using subscriber information (e.g., international mobile subscriber identifier (IMSI)) stored in the subscriber identification module 896.

The antenna module 897 may transmit or receive signals or power to or from the outside (e.g., an external electronic device). According to an embodiment, the antenna module 897 may include one or more antennas, and at least one antenna, which is suitable for a communication scheme used in a communication network such as the first network 898 or the second network 899, may be selected, for example, by the communication module 890. The signals or power may be transmitted or received between the communication module 890 and an external electronic device through the at least one selected antenna.

At least some of the elements may be connected to each other through a communication scheme (for example, a bus, general purpose input and output (GPIO), a serial peripheral interface (SPI), or a mobile industry processor interface (MIPI)) between peripheral devices, and may exchange signals (e.g., a command or data) with each other.

According to an embodiment, a command or data may be transmitted or received between the electronic device 801 and the external electronic device 804 through the server 808 connected to the second network 899. Each of the electronic devices 802 and 804 may be a device, the type of which is the same as or different from the electronic device 801. According to an embodiment, all or a part of operations to be executed in the electronic device 801 may be executed in one or more external devices among the external electronic devices 802, 804, or 808. For example, when the electronic device 801 needs to perform a certain function or service automatically or in response to a request from a user or another device, the electronic device 801 may request one or more external electronic devices to perform at least a part of the function or the service, instead of internally executing the function or service or additionally. One or more external electronic devices having received the request may execute at least a part of the requested function or service or an additional function or service associated with the request, and may transmit a result of the execution to the electronic device 801. The electronic device 801 may process the received result as it is or additionally, and provide a result of the processing as at least part of a response to the request. To this end, for example, cloud computing, distributed computing, or client-server computing technology may be used.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary.

What is claimed is:

1. A method performed by a terminal in a wireless communication system, the method comprising:
   receiving, from a base station, a radio resource control (RRC) message including physical uplink control channel (PUCCH) spatial relation information, the PUCCH spatial relation information indicating a spatial relation between a reference signal and a PUCCH; and
   when the PUCCH is scheduled for transmission via a first PUCCH resource and a second PUCCH resource, transmitting the PUCCH via the first PUCCH resource to the base station using a first beam and transmitting the PUCCH via the second PUCCH resource to the base station using a second beam,
   wherein the first beam and the second beam are identified based on the PUCCH spatial relation information included in the RRC message.

2. The method of claim 1, further comprising receiving, from the base station, a medium access control (MAC) control element (CE) to indicate two activated spatial relations of the PUCCH spatial relation information.

3. The method of claim 1, wherein the first beam and the second beam are identified in response to a number of PUCCH transmissions being configured as 2.

4. The method of claim 1, wherein the reference signal is one of a synchronization signal block (SSB), a channel state information-reference signal (CSI-RS), or a sounding reference signal (SRS).

5. The method of claim 1, further comprising receiving, from the base station, a downlink signal on a physical downlink shared channel (PDSCH),
   wherein the PUCCH includes feedback information for the downlink signal.

6. A method performed by a base station in a wireless communication system, the method comprising:
   transmitting, to a terminal, a radio resource control (RRC) message including physical uplink control channel (PUCCH) spatial relation information, the PUCCH spatial relation information indicating a spatial relation between a reference signal and a PUCCH; and
   when the PUCCH is scheduled for transmission via a first PUCCH resource and a second PUCCH resource, receiving the PUCCH via the first PUCCH resource from the terminal using a first beam and receiving the PUCCH via the second PUCCH resource from the terminal using a second beam,
   wherein the first beam and the second beam are associated with the PUCCH spatial relation information included in the RRC message.

7. The method of claim 6, further comprising transmitting, to the terminal, a medium access control (MAC) control element (CE) to indicate two activated spatial relations of the PUCCH spatial relation information.

8. The method of claim 6, wherein the first beam and the second beam are identified in response to a number of PUCCH transmissions being configured as 2.

9. The method of claim 6, wherein the reference signal is one of a synchronization signal block (SSB), a channel state information-reference signal (CSI-RS), or a sounding reference signal (SRS).

10. The method of claim 6, further comprising transmitting, to the terminal, a downlink signal on a physical downlink shared channel (PDSCH),
    wherein the PUCCH includes feedback information for the downlink signal.

11. A terminal in a wireless communication system, the terminal comprising:
    memory storing instructions;
    a transceiver; and
    a processor,
    wherein the instructions, when executed by the processor, cause the terminal to:
      receive, from a base station, a radio resource control (RRC) message including physical uplink control channel (PUCCH) spatial relation information, the PUCCH spatial relation information indicating a spatial relation between a reference signal and a PUCCH, and
      when the PUCCH is scheduled for transmission via a first PUCCH resource and a second PUCCH resource, transmit the PUCCH via the first PUCCH resource to the base station using a first beam and transmit the PUCCH via the second PUCCH resource to the base station using a second beam,
    wherein the first beam and the second beam are identified based on the PUCCH spatial relation information included in the RRC message.

12. The terminal of claim 11, wherein the instructions, when executed by the processor, further cause the terminal to receive, from the base station, a medium access control (MAC) control element (CE) to indicate two activated spatial relations of the PUCCH spatial relation information.

13. The terminal of claim 11, wherein the first beam and the second beam are identified in response to a number of PUCCH transmissions being configured as 2.

14. The terminal of claim 11, wherein the reference signal is one of a synchronization signal block (SSB), a channel state information-reference signal (CSI-RS), or a sounding reference signal (SRS).

15. The terminal of claim 11, wherein the instructions, when executed by the processor, further cause the terminal to receive, from the base station, a downlink signal on a physical downlink shared channel (PDSCH), and
    wherein the PUCCH includes feedback information for the downlink signal.

16. A base station in a wireless communication system, the base station comprising:
    memory storing instructions;
    a transceiver; and
    a processor,
    wherein the instructions, when executed by the processor, cause the base station to:
      transmit, to a terminal, a radio resource control (RRC) message including physical uplink control channel (PUCCH) spatial relation information, the PUCCH spatial relation information indicating a spatial relation between a reference signal and a PUCCH, and
      when the PUCCH is scheduled for transmission via a first PUCCH resource and a second PUCCH resource, receive the PUCCH via the first PUCCH resource from the terminal using a first beam and receive the PUCCH via the second PUCCH resource from the terminal using a second beam,
    wherein the first beam and the second beam are associated with the PUCCH spatial relation information included in the RRC message.

17. The base station of claim 16, wherein the instructions, when executed by the processor, further cause the base station to transmit, to the terminal, a medium access control (MAC) control element (CE) to indicate two activated spatial relations of the PUCCH spatial relation information.

18. The base station of claim 16, wherein the first beam and the second beam are identified in response to a number of PUCCH transmissions being configured as 2.

19. The base station of claim 16, wherein the reference signal is one of a synchronization signal block (SSB), a channel state information-reference signal (CSI-RS), or a sounding reference signal (SRS).

20. The base station of claim 16, wherein the instructions, when executed by the processor, further cause the base station to transmit, to the terminal, a downlink signal on a physical downlink shared channel (PDSCH), and wherein the PUCCH includes feedback information for the downlink signal.

* * * * *